United States Patent [19]

Lemke et al.

[11] Patent Number: 4,472,697

[45] Date of Patent: Sep. 18, 1984

[54] ARMATURE ASSEMBLY FOR MACHINE TOOL RELAY

[75] Inventors: Winfred R. Lemke, Mequon; James T. Tucker, Menomonee Falls; Kenneth H. Marien, Wauwatosa; Joseph J. Gribble, Milwaukee, all of Wis.

[73] Assignee: Square D Company, Palatine, Ill.

[21] Appl. No.: 411,388

[22] Filed: Aug. 25, 1982

[51] Int. Cl.³ .............................................. H01H 3/60
[52] U.S. Cl. .................... 335/193; 335/247; 335/277
[58] Field of Search ............... 335/193, 247, 248, 262, 335/277

[56] References Cited

U.S. PATENT DOCUMENTS

| | | | |
|---|---|---|---|
| 3,145,327 | 8/1964 | Thayer et al. | 335/247 |
| 3,501,724 | 3/1970 | Westphal | 335/277 |
| 3,503,019 | 3/1970 | Kussy et al. | 335/193 |
| 4,063,204 | 12/1977 | McFarlin | 335/193 |
| 4,184,134 | 1/1980 | Kane et al. | 335/198 |

Primary Examiner—J. D. Miller
Assistant Examiner—Jeffrey Sterrett
Attorney, Agent, or Firm—William H. Schmeling; Richard T. Guttman

[57] ABSTRACT

A low cost electromagnet assembly for a relay. The assembly includes an I-shaped stationary magnet that extends through a passage in a magnet coil and a U-shaped armature assembly with the armature assembly. The armature assembly includes a molded armature guide having projections on a rear wall of the guide arranged to actuate a plurality of switch plungers, side walls extending from the rear wall defining a cavity and an opening in the rear wall exposing a portion of the cavity at the rear wall side of the guide. The assembly also includes the U-shaped armature having a body portion positioned in the cavity and an elastomeric pad position between the armature body portion and the rear wall and a conical spring between the body and guide for absorbing shock created when the electromagnet is deenergized.

14 Claims, 17 Drawing Figures

ARMATURE ASSEMBLY FOR MACHINE TOOL RELAY

This invention relates to electromagnet and is more particularly concerned with an electromagnet structure having reduced bounce characteristics that occur when the electromagnet is deenergized.

BACKGROUND OF THE INVENTION

One of the major performance tests imposed on a class of electromagnetic devices known as machine tool relays is that the relays must satisfy the parameters of a Life or Load Test as well as a Contact Fidelity Test. To satisfy the requirements of the Life or Load Test, five relays when tested must have a minimum average life of 13 million operations and a minimum life of 10 million operations without any failures of a mechanical or electrical nature. To satisfy the Contact Fidelity Test, five relays are wired in a modified timed open loop rat race circuit with the five relays furnishing 36 contacts in the circuit. To satisfy the test, the relays must achieve seven million trouble free operations without adjustment or repair and the 36 contacts must function properly for a minimum agregate of 50 million contact operations per failure with the test terminated and the final results calculated after five contacts have failed.

SUMMARY OF THE INVENTION

The present invention relates to an electromagnet structure that is particularly suited for use in a machine tool relay which is required to provide millions of faultless operations without failure. The shock generated when the electromagnet is energized is absorbed by shock pads located between the stationary magnet and the base. The stationary magnet does not compress the shock pads when the electromagnet is deenergized to maximize the performance of the shock pads. The structure includes an armature guide that has a rear or bottom wall with a pair of openings therein and wall defining an internal cavity. An elastomeric pad is positioned in the cavity between the rear wall and an armature. The armature has pole faces facing and arranged to engage pole faces on the stationary magnet. A conical spring positioned between the armature and a part secured to the armature guide along with the elastomeric part absorbs initial shock generated when the electromagnet is deenergized. The conical spring is selected to be stronger than the sum of the forces generated by the springs within switching cartridges in the relay and springs which cause the components of the relay to move to a deenergized position.

It is an object of the present invention to provide a relay that will provide millions of fault free contact operations.

Another object is to provide a relay with a movable armature assembly that includes an armature, an armature guide, an elastomeric part that is positioned in the armature assembly to engage a stationary abutment to absorb shock when the relay is deenergized and a spring positioned between the armature and the armature guide to absorb initial shock after the elastomeric pad engages the abutment.

A further object is to provide a relay with an improved electromagnetic assembly that includes a movable armature, a stationary magnet, a magnet coil, an armature guide, an elastomeric part positioned between the armature and armature guide and a conical spring reacting between the armature guide and the armature with the conical spring and the elastomeric part positioned to oppose relative motion between the armature and armature guide in opposite directions.

Further objects and features of the invention will be readily apparent to those skilled in the art from the following specification and from the appended drawings illustrating a preferred embodiment, in which.

An electromagnetically operated switch or relay 20 as shown in the drawings includes a housing 22 formed of three housing parts designated as a base part 24, an upper or front housing part 26 and a middle housing part 28. The relay 20 additionally includes a base plate 30 secured to a rear side of the base part 24 and a cover 32 secured to a front side of the upper part 26. The base plate 30 includes suitable openings to secure the relay 20 to a panel, not shown.

The relay 20 includes an electromagnet assembly 34 comprising or C or U-shaped armature assembly 36, a magnet coil 38 and an I-shaped stationary magnet 40. Additionally the relay includes a plurality of switch cartridges designated by a numeral 42, and a T-bar switch actuator 44.

Figure 5:
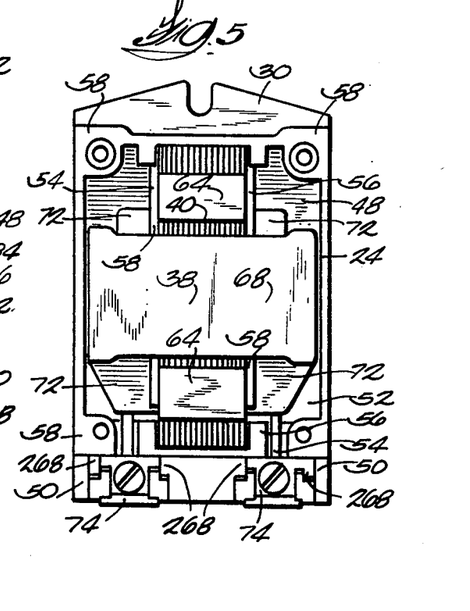
FIG. 5 is a top view of a base part of the relay in FIG. 1 with a magnet coil and stationary magnet pole piece of the relay installed in a cavity in the base part.

The base part 24 is rectangular in shape as shown in FIG. 5 and is preferably formed of a molded insulating material to have a rectangularly shaped cavity 48 with a pair of spaced columns 50 extending forwardly from a rear wall 52 of the base part 24. Extending forwardly into the cavity 48 from the rear wall 52 are two spaced abutments 54 on which elastomeric shock absorbing pads 56 are secured. Passages in abutments 58 located at each of the four corners of the base part 24, receive four screws that are used to secure a base plate 30 to the rear wall 52. The base part 24 provides a support for and positions the magnet coil 38 and the stationary magnet 40. The magnet 40 is formed of a stack of laminated magnet steel plates which are sandwiched and held together between a pair of magnetic steel plates by suitable rivets. The magnet 40 has projecting ends 62 providing surfaces that are positioned on the pads 56. Portions of the rear surface of the magnet 40 adjacent the outer ends are grooved as at 66 to reduce the cross-sectional area of the magnet 40 that extends outwardly from the ends of the magnet ground pole faces 64 located on the front surface of the magnet 40. The grooves 66 are provided to reduce the leakage flux through the base plate 30 when the magnet coil 38 is energized.

The magnet coil 38 is formed as an encapsulated coil winding to provide a generally rectangular body 68 with a rectangular passage 70 extending through the body 68. Along its rear end the coil 38 has four abutments 72 which are located to straddle the abutments 54 and thus position the coil 38 in the cavity 48. Extending from two of the abutments 72 are wire leads that extend to a pair of terminals 74. The leads are received in passages extending forwardly in the columns 50 to position the terminals 74 at the front end of the columns 50. The stationary magnet 40 extends through the passage 70 and is positioned on the pads 56 to present the pole faces 64 which face forwardly of the exterior of the magnet coil 38.

The housing part 26 has a rectangularly shaped rear end 80 and a rectangularly shaped cavity 82 extending from the rear end 80 to a dividing wall 84. The wall 84 separates the cavity 82 at the rear side of the part 26 from four spaced cavities 86 located in the part 26 at the front side of the wall 84. Extending rearwardly along each of the four corners of the cavity 82 are columns 88 each having a rearwardly facing threaded insert 89 embedded therein. Additionally extending rearwardly from the wall 84 along each of the opposed sidewalls 90 and 92 of the front part 26 are pairs of columns 94 and 96 respectively. The rear ends of the columns 94 and 96 are spaced forwardly of the rear end 80 and each of the four columns 94 and 96 has a spring 98 positioned therein that has a rear end disposed forwardly of the rear end of the columns 94 and 96 and forwardly of the rear end 80. The springs 98 are located to engage the front surface of the coil body 68 to resiliently position the coil body 68 in the cavity 48.

Figures 8, 9:
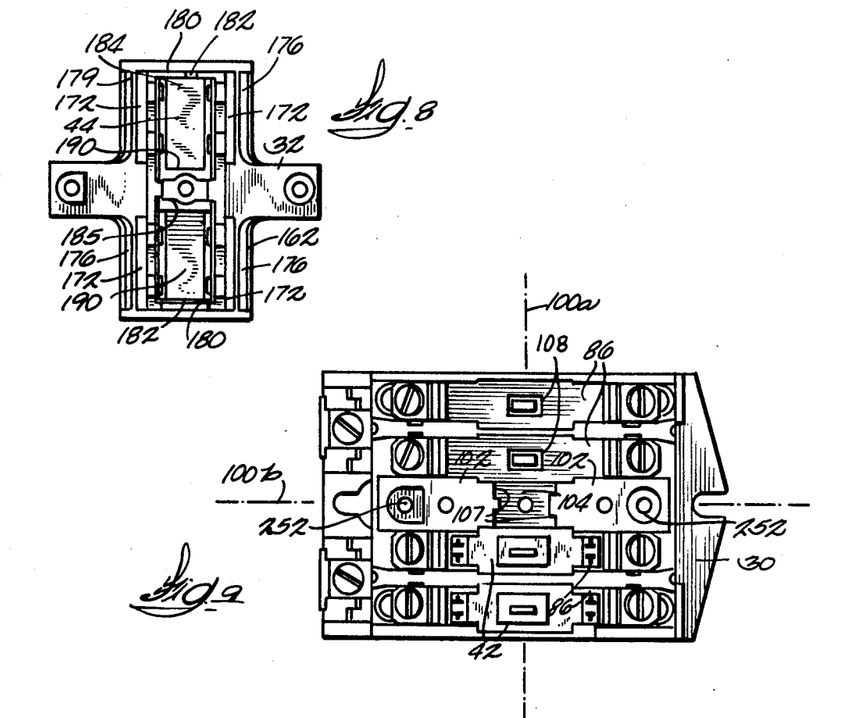
FIG. 8 is a plan view of a cover and a T-bar actuator used in the relay in FIG. 1.
FIG. 9 is a plan view of the relay in FIG. 1 with the cover, actuator and two switch cartridges removed.
Figure 10:
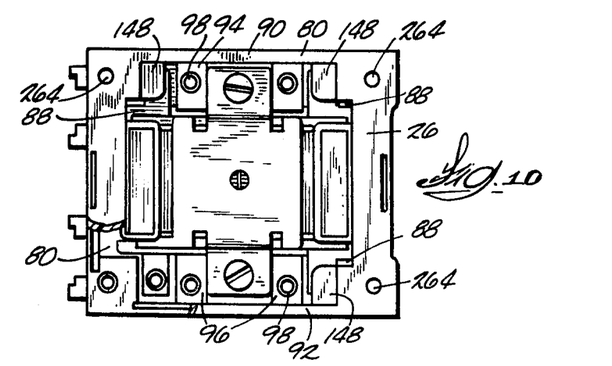
FIG. 10 is a rear plan view of the housing part in FIG. 1 with base part of the relay removed.
Figure 11:
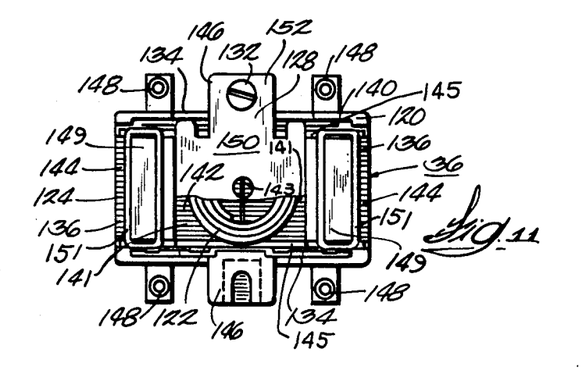
FIG. 11 is a rear plan view of an armature assembly used in the relay in FIG. 1 with a portion of a retainer plate for a conical spring removed to illustrate the position of the spring.
Figure 12:
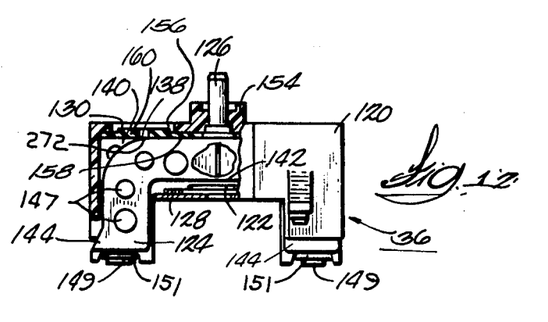
FIG. 12 is a side view partly in section of the armature assembly in FIG. 11.
Figure 13:
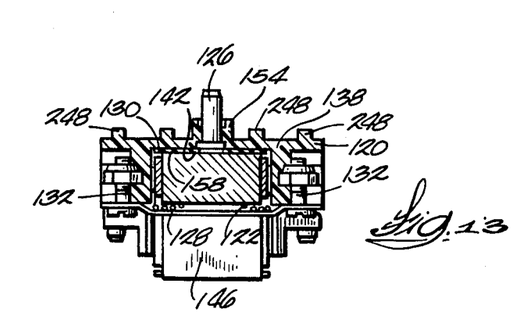
FIG. 13 is a view partly in section of an end of the assembly in FIG. 11.
Figure 14:
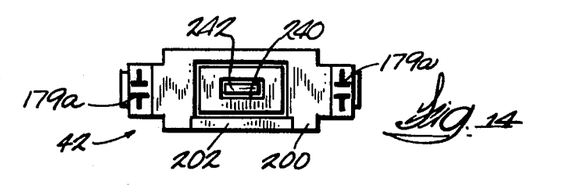
FIGS. 14–17 are selected views of a switch cartridge used in the relay shown in FIG. 1.
Figure 15:
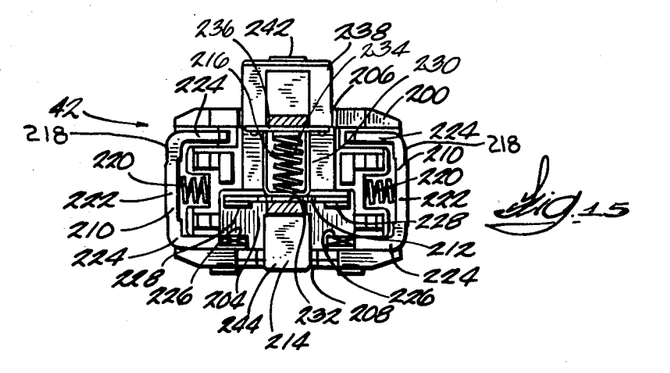
Figure 16:
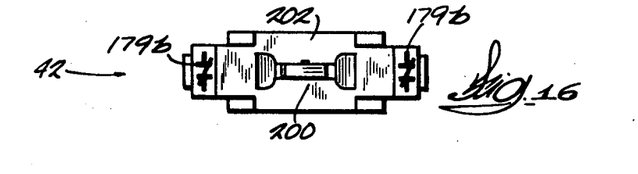
Figure 17:
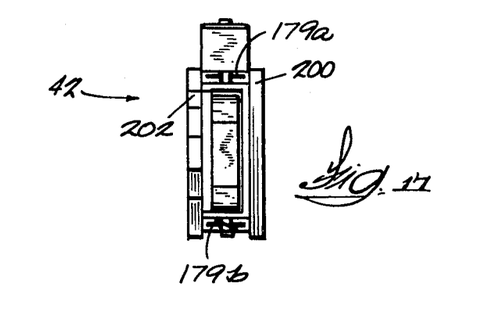

For discriptive purposes the front part 26 can be described as being symmetrical about two mutually perpendicular planes that extend through the relay and perpendicular to the base plate 30 and are defined by mutually perpendicular center lines or planes 100a and 100b. For purpose of discription the center line 100a considered as a horizontal center line or plane and the center line or plane 100b as a vertical centerline or plane in FIG. 9. The four cavities 86 are centered on center line 100a and two of the cavities 86 are located at the left or lower side of the center line 100b and two of the cavities 86 are located on the right or upper side of centerline 100b as shown in FIG. 9. Separating the cavities 86 at the left side of the center line 100b from the cavities 86 at the right of the center line 100a are a pair of columns 102. The columns 102 are centered on the center line 100b and are spaced on opposite sides of center line 100a and an opening 104 in the wall 84 to present guide surfaces 107 that are equidistantly spaced on opposite sides of the center line 100a. Each of the cavities 86 has an opening 108 connecting its associate cavity 86 with the cavity 82. The openings 108 are centered on the centered line 100a and provide for the passage of projections, to be later described, on the armature assembly 36.

Figure 3:
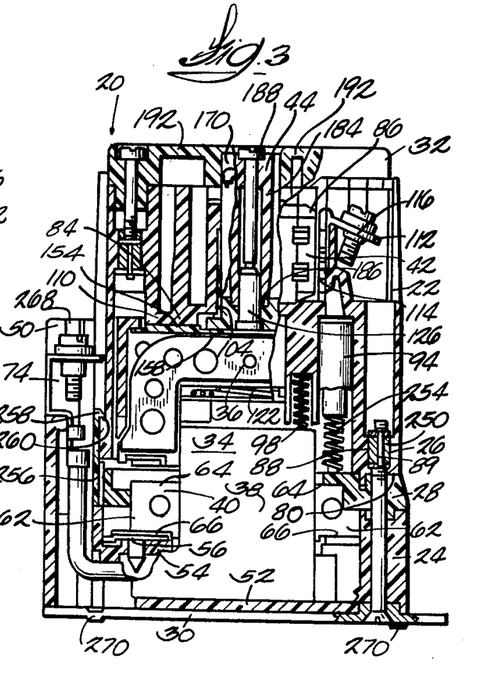
FIG. 3 is a cross-section view taken along line 3—3 in FIG. 1.
Figure 4:
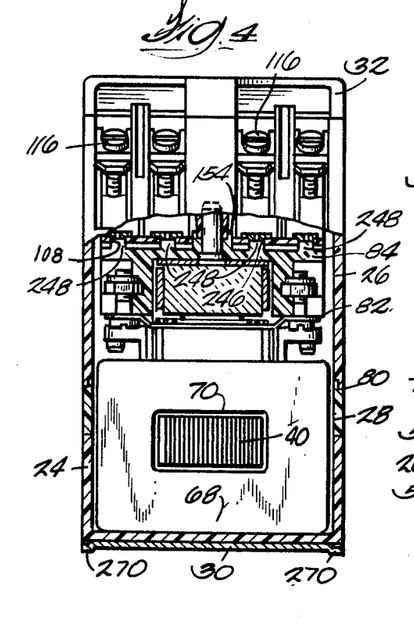
FIG. 4 is a cross-section view taken along line 4—4 in FIG. 1.

A pair of bosses 110, one of which is shown in FIG. 3 extends rearwardly from the wall 84. The bosses 110 are centered on the center line 100b and are equidistantly spaced on opposite sides of the opening 104. Each of the cavities has a pair of terminal assemblies 112 associated therewith which provide electrical connections to switch cartridges 42 that are individually positioned in a cavity as will be later described. As shown in FIG. 3, each terminal assembly 112 is provided with a switch contacting portion 114 that extends along an end wall of its associated cavity 86 and a portion supporting a wire clamp and screw 116 that is provided to secure a bared end of a wire conductor, not shown.

The armature assembly 36 includes an armature guide 120, a conical spring 122, an armature 124, a threaded insert 126, a retaining plate 128, an elastomeric shock absorber 130 and nuts and screws 132. The armature guide 120 is preferably formed as a molded plastic part having a generally rectangular shape having a pair of relatively thin side walls 134, a pair of end walls 136 and a bottom wall 138 defining a cavity 140.

The armature 124 is positioned in the cavity 140 and is formed of two stacks of L-shaped magnet iron parts 141 which are assembled on opposite sides of a non-magnet metal shim or spacer 143 to form a U-shaped assembly that is sandwiched between a pair of U-shaped non-magnetic iron parts 145. The parts 141, the shim 143 and the parts 145 are maintained in position by suitable rivets 147. The U-shaped armature 124, when thus assembled, has a bight portion 142, the rear side of which, faces the bottom wall 138 with the elastomeric shock absorber 130 positioned between the rear side of the bight portion 142 and the bottom wall 138. The armature 124 also has a pair of legs 144 extending from opposite ends of the bight portion 142 to ground pole faces 149 formed at the ends of the legs 144 and external to the armature guide 120. The pole faces 149 are suitably groved to receive and position shading coils 151 that are included in the armature 124 instead of the stationary magnet for the purposes well known to those skilled in the art.

The armature assembly 36 is positioned so as to be movable and guided in the cavity 82. To accomplish the guiding function of the armature assembly 36, the armature guide 120 is provided with a pair of oppositely extending abutments 146, that extend from the exterior of side walls 134 and are sized to be received and guided between the spaced pair of columns 94 along side wall 90 and columns 96 along side wall 92. Additionally the armature guide 120 is provided with two pairs of spring seats 148 extending as pairs from the side walls 134 and spaced equidistantly at opposite sides of the pair of abutments 146 so the two pairs of columns 94 and 96 are received in the four spaces provided between the pair of abutments 146 and the four spring seats 148. The retaining plate 128 has a body portion 150 sized and shaped to be received between the legs 144 and a pair of portions 152 extending from the body portion 150 to overlie the pair of abutments 146. The abutments 146 and portions 152 receive the pair of nuts and screws 132 and secure the plate 128 in position where it overlays the bight portion 142 and compresses the conical spring 122 that is positioned between the bight portion 142 and the body portion 150. The threaded insert 126 is centered on the planes defined by the intersection of the centerlines 100a and 100b to have an exposed female nut extending from a base that is non-rotatably received in a rectangularly shaped raised boss 154. The boss 154 extends from the center of the exterior of the bottom wall 138 and is sized to be received in the opening 104. The bottom wall 138 has a pair of rectangularly shaped openings 156 centered on centerline 100b and spaced equidistantly at opposite sides of the boss 154. The pair of openings 156 are aligned with the pair of bosses 110. The elastomeric shock absorber 130 has a main body portion 158 positioned and compressed between the confronting surface on the bight portion 142 and the bottom wall 138 and a pair of raised bosses 160 extending in openings 156 in positions to engage the bosses 110 to act as shock absorbers when the relay is deenergized.

The cover 32 is formed as a molded plastic part to have a body portion 162 overlapping the front end of cavities 86 and a pair of arms 164 overlaying the front ends of columns 102 so screws 166 extending through suitable openings in the arms 164 maybe threaded into openings in the front part 26 to secure the cover 32 to the front part 26. The cover 32 has an opening 168 centered in the planes defined as 100a and 100b that receives a projection 170 on the T-bar actuator 44. The rear face of the cover is provided with a pair of ribs 172 extending parallel and spaced from plane 100a. The ribs 172 have rear edges engaging portions on the front surfaces of the switch cartridges 42 on opposite sides of the operating plungers of the cartridges 42. Additionally walls 176 of the cover 32 extending rearwardly from marginal edges of a front face of the cover 32 are tapered to expose the markings 179a and 179b on the switch cartridges 42. A wall 180 extending between the ribs 172 at each of the two ends of the cover 32 includes a suitable guide surface and an opening that is closed at the rear end of the cover by an obstruction which is engaged by an extending tang 182 formed at the extreme ends on a pair of arms 184 of the T-bar actuator 44 to maintain an assembly between the T-bar actuator 44 and the cover 32.

A stem portion 185 of the T-bar actuator is received in the opening 104 and includes portions guided by the guide surfaces 107 and an end 186 that is attached to the boss 154 of the armature assembly 36. The attachment is achieved by a screw 188 that extends through a suitable bore in the stem portion 185 and is threaded into the insert 126 so the armature assembly 36 and the T-bar actuator 44 are conjointly movable. The pair of arms 184 extend in opposite directions from the stem portion 185 and have rear surfaces 190 facing the front surface of the armature guide 120.

The switch cartridges 42 are insertable with a plug-in operation in either of two positions in the cavities 84 to provide a normally open or a normally closed type of switch contact operation. The insertion is accomplished with the cover 32 and captive T-bar actuator 44 removed by loosening screws 166 and 188 and detaching the cover 32 from the front face of the front part 26. Each of the switch cartridges 42 includes a housing formed of a molded base part 200 and a molded cover 202 as shown in FIGS. 14–17. The cover 202 is secured to the base 200 with a snap fit when suitably located fingers on the cover 202, not shown, having hooks at their free ends are received in openings in the base 200. When the cover 202 and the base 200 are assembled, the switch cartridge 42 has an internal cavity 204 and an opening 206 at one end and an opening 208 at the other end with the opening 206 larger in size than the opening 208.

Each switch cartridge 42 includes a pair of stationary contact assemblies 210, the internal cavity 204, the larger opening 206, the smaller opening 208, a movable contact assembly 212, a plunger 214 and movable contact spring 216. Each stationary contact assembly 210 includes a U-shaped part 218 and a spring 220 with a bight portion 222 of the U-shaped part 218 exposed along an external side area of its associated switch cartridge 42 to engage the portions 114 of the terminal 112. Arm portions 224 extending from the bight portion 222 provide guides for movement of the assemblies 210 in the cavity 204 and the springs 220 constantly urge the bight portion 222 into engagement with the portions 114. One of the arm portions 224 is longer than the other and has a contact surface 226 thereon which is aligned with a similar contact surface 226 on the other stationary contact assembly 210 in the cavity 204.

The contact surfaces 226 are located at the end of the cavity 204 having the smaller opening 208 and face toward the cavity 204 where they are positioned to be engaged by the contact surfaces 228 of the movable contact assembly 212. The plunger 214 and the movable contact assembly 212 are movable in the plane 100a and position the contact surfaces 228 equidistantly at opposite sides of the plane 100a to engage the surfaces 226. The plunger 214 has a passage 230 extending there-thru providing an end 232 upon which the central portion of the movable contact assembly 212 is positioned by the spring 216. The spring 234 has it other end positioned on a spring seat 236. The spring seat 236 is secured to the terminal ends of a pair of arms of a U-shaped member 238. The member 238 is movable in the opening 206 and has an opening 240 in its bight portion that provides a passage for terminal end 242 of the plunger 214.

The switch cartridges 42 are programmed in the relay 20 by inserting the cartridges 42 into the cavities 86. When the cartridges 42 are positioned to provide a normally open contact function, a designation 179 provided with a suffix "a" as in FIG. 14 will be visable through a space provided by the tapered walls 176 at the front of the relay 20. Similarly when the cartridges 42 are inserted in the cavities 86 to provide a normally closed type contact function, the designation 179 with a suffix "b" will be visible. The cartridges 42 when positioned in the cavities 86 to provide normally open type contact operation, will have an end 244 of the plunger 214 extending through the opening 108 in the wall 84 centered in centerline 100b into engagement with a boss 248 formed on the front side of the armature assembly 36. The armature assembly 36 has a plurality of bosses 248 equal in number to the number of cavities 86 and openings 108 with each boss 248 sized and located to extend into an opening 108 and constantly into engagement with an end 244. When the cartridges 42 are thus positioned to provide a normally open type of operation the other end 242 of the plunger 214 carrying the U-shaped member 238 will be positioned at their furthest extended position out of the housing for the cartridges 42 and at a position where the rear surface of the T-bar actuator 44 engages the terminal ends of the end 242 and the U-shaped member 238 while the end 244 is engaged by the boss 248 to thus trap the plunger 214 between the T-bar actuator 44 and the bosses 248 of the armature assembly 36.

The following description of the assembly of the relay 20 is presented for informational purposes as variations thereof are clearly apparent. Initially the base plate 30 is positioned on the rear side of the base part 24 by four screws that are received in bores in abutments 58. The stationary magnet part 40 and the magnet coil are positioned in the cavity 48 with the ends 62 positioned on the shock pads 56 and the pair of terminals 74 positioned on the front end of the columns 50. The front upper part 26 is assembled by inserting the terminal assemblies 112 in their proper positions in the base part 24 and inserting the springs 98 in openings in the pairs of columns 94 and 96. Four inserts 250 in each of the four columns 88 and a pair of inserts 252 are embedded in the part 24 when the part 24 is initially formed or assembled. The assembled armature assembly 36 is positioned in the cavity 82 to have; the boss 154 received in the opening 104, the bosses 248 received in the openings 108, the four spring seats 148 are each positioned between the columns 88 and the columns 94 or 96, the shock absorber bosses 160 engaging the bosses 110 and the abutments 146 positioned between the pairs of columns 94 and 96.

Figure 1:
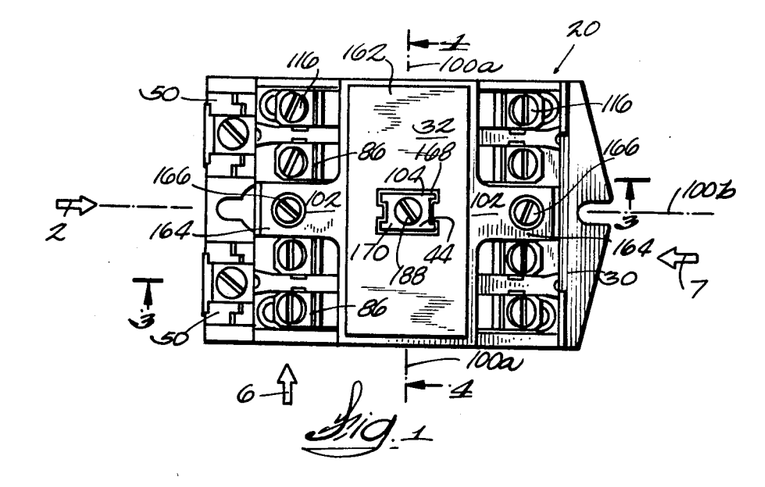
FIG. 1 is a top plan view of an electromagnetically actuated switch or relay incorporating features of the present invention.
Figure 2:
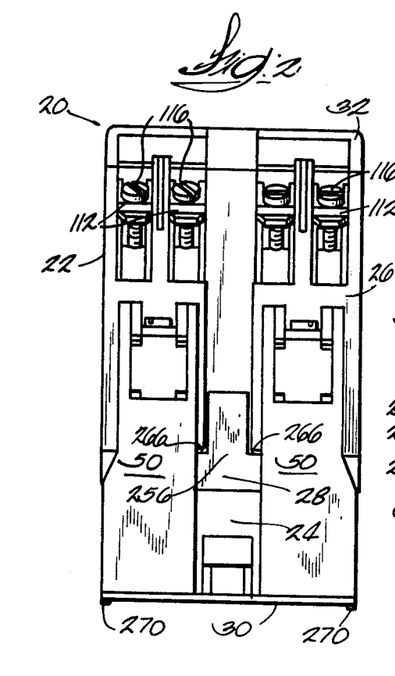
FIG. 2 is an end elevation view of the relay taken in the direction of arrow 2 in FIG. 1.
Figure 6:
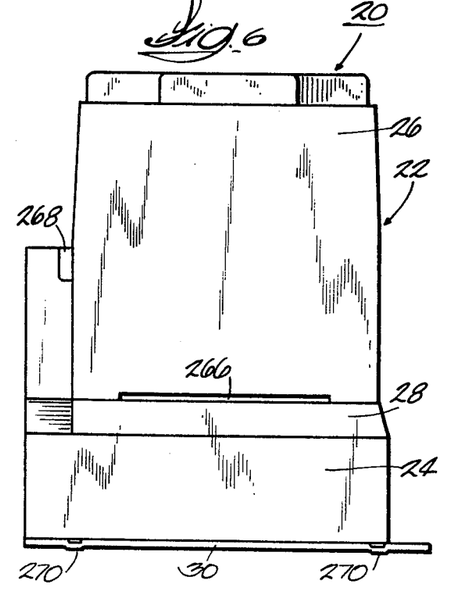
FIG. 6 is a side elevation view of the relay taken in the direction of the arrow 6 in FIG. 1.
Figure 7:
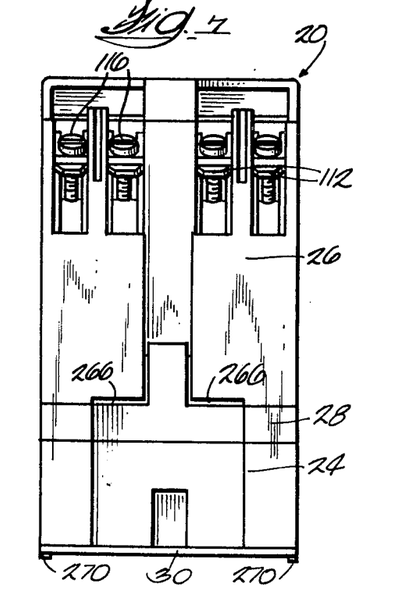
FIG. 7 is an end elevation view of the relay taken in the direction of arrow 7 in FIG. 1.

After the armature assembly 36 is thus positioned in the cavity 82, four armature return springs 254 are positioned on spring seats 148. The middle part 28 is then positioned at the rear end 80 and moved into a clipped-on position with the front part 26 as a pair of yieldable fingers 256 projecting forwardly from the front side of part 28 having hooks 258 at their free ends are hooked behind edges 260 formed on the outer surface of the part 26 as illustrated in FIG. 3. When the part 28 is thus clipped-on the part 24, the four springs 254 which were positioned on spring seats 148 prior to the assembly of parts 26 and 28 are engaged by the spring seats 149 on the part 28 and compressed to constantly urge the armature assembly 36 into engagement with the bosses 110. The assembly of the parts 26 and 28 with the base 24 and base plate 30 is accomplished by positioning the end 80 on the front face of the base with the screws 60 extending through bores 264 in abutments 58, and threaded into the inserts 89 to secure the base plate 30, the base part 24, the middle part 28 and the upper front part 26 together. At this point it should be noted that, as shown in FIGS. 2, 6 and 7, notches 266 are formed in the edges of the material forming the end 80 in the area between the columns 88 so that the only area of engagement between the parts 26 and 28 occurs solely at the four corners of the parts 26 and 28 so as to minimize contact bounce of the relay 20. Contact bounce of the relay 20 is further reduced by four protrusions or projections 270 that are formed to protrude from the rear surface of the base plate 30. The projections 270 engage a panel when the relay is mounted on the panel and are aligned with the four corners of the relay 20. As previously noted, the notches 266 dictate that forces transmitted between the parts 24, 26 and 28 of the relay 20 will be confined to the four corners of the relay 20. Thus as the projections 270 are aligned with the corners of the base part 24, forces generated by the energization and deenergization of the relay 20 will be transmitted to the panel mounting panel without influence from the flexing of the baseplate in response to the forces. When the part 26 and 28 are secured together, suitably located projections 268 extending from the outer wall of the part 26 will overlay portions of the terminals 74 to position the wire clamping portions of the terminals 74 on the outer side of the relay 20.

The switch cartridges 42 are then inserted into the cavities 86. As previously described, the cartridges 42 may be oriented in either of two positions when they are inserted into the cavities 86 to provide a plug-in type connection with the terminals 112 and a normally open or normally closed type of switching contact operation. Also the contact operation may be changed without disturbing or changing any wire connection to the relay when the switching operation is changed after the relay is mounted and wired. The assembly of the relay is completed when the assembled cover 32 and T-bar actuator 44 are positioned at the front end of the relay 20 and attached to the part 26 and armature assembly 36 by screws 166 and screw 188 respectively. The attachment of the cover 32 to part 26 will maintain the inserted plug-in position of the cartridges 42 in the cavities 86 while exposing the markings 179a and 179b to the front side of the relay 20. The attachment of the T-bar actuator 44 to the armature assembly 36 by means of the screw 188 will cause the ends of the plunger 214 to be entrapped between the bosses 248 and the rear surface 190 so the plungers 214 are physically moved without assistance from any springs associated with the switch cartridges 42 to their normally open and normally closed contact position. Thus the operation of the relay 20 may be easily monitored for proper operation by conventional checking circuits well known to those skilled in the art.

Referring to FIGS. 3, and 11–13, the armature assembly 36 is formed into a unitary component of assembled parts comprising: the armature 124, the armature guide 120, the retaining plate 128, the nuts and screws 132, the elastomeric shock absorber 130, the conical spring 122 and the two abutments 146 and four spring seats 148 the latter being parts of the armature guide. The four springs 254 reacting on the spring seats 148 constantly urge the armature assembly 36 in a direction toward the wall 84 on which bosses 110 are located which is opposite the direction in which the armature 124 is moved when portions on the shock absorber 130 engage the bosses 110.

The reduction of contact bounce when the coil 38 is deenergized is accomplished as follows. The armature 124 is moved into engagement with the stationary magnet 40 when the magnet coil 38 is energized. The movement of the armature 124 is opposed by the four springs 254 and the engagement shock between the armature 124 and the stationary magnet 40 is absorbed by shock pads 56. The deenergization of the coil 38 results in movement of the armature 124 in the direction toward the wall 84 by a force supplied by the four springs 254. During this movement interval, the armature 124 and the armature guide 120 move conjointly until the armature is at a position where the raised bosses 160 on the elastomeric part or shock absorber 130 and extending through the openings 156 resiliently engage the bosses 110 on the upper housing part 26. The resilient engagement between the bosses 160 and the bosses 110 causes the armature 124 to rebound and move in a direction which is opposite the direction of movement that caused the rebound. Thus during a brief instant the contact guide 120 is moving in a direction toward the wall 84 and the armature 124 is moving in an opposite direction or away from the wall 84. The opposed movements of the armature 124 and the armature guide 120 is absorbed by and results in the compression of the conical spring 122. The absorption of the effect of the differences in direction of movement of the armature 124 and the armature guide 120 diminishes the effect of the rebound of the armature 124 on the armature guide 120 as it continues to move in a direction toward the wall 84. The movement of the armature guide 120 in the direction towards the wall 84 moves the switch cartridge 42 and plungers 214 to their deenergized positions as previously described.

The material and the thickness of the bosses 160 and the characteristics of the conical spring 122 are selected so the spring rate of the bosses 160 is greater than the conical spring 122. Additionally the portions of the elastomeric shock absorber 130 providing each of the bosses 160 is provided with the openings 272. The openings 272 are centrally located in the bosses 160 and are provided to increase the shock absorbing capability of the elastomeric shock absorber 130. While the phenomenon provided by the openings 272 in the increase of the shock absorbing capability of the shock absorber 130 is not understood, it is believed that it reduces the distances molecules in the material forming the shock absorber 130 move in response to the cushioned impact between the armature and the wall 84.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:
1. An electromagnet assembly comprising:
   a magnet coil having a body with a passage extending through the body and a coil winding surrounding the passage,
   a stationary magnet extending through the passage and having laminated magnet metal pieces providing a pair of pole faces facing in one direction,
   and a magnet armature assembly including;
   a movable armature guide having a rear wall having an opening therein and side walls providing a cavity,
   a magnet armature positioned in the cavity, said armature including a body portion and a pair of legs extending at opposite ends of the body portion toward the pole faces of the stationary magnet,
   an elastomeric part positioned between the rear wall and a rear surface on the body portion for resisting movement of the armature in a first direction relative to the armature guide, said elastomeric part having a portion exposed by the opening and engagable with a stop for limiting movement of the armature assembly in the said one direction,
   and a resilient means urging the armature in a direction opposite the first direction relative to the armature guide, said resilient means including a member extending between the side walls of the armature guide and a spring positioned between the member and a front surface on the body portion.
2. The electromagnet assembly as recited in claim 1 wherein the stationary magnet is I-shaped and the armature is C-shaped.
3. The electromagnetic assembly as recited in claim 2 wherein the spring has a conical shape.
4. The electromagnet assembly as recited in claim 3 wherein the rear wall has a pair of openings equidistantly spaced on opposite sides of a centerline and the elastomeric part has a pair of bosses extending into the openings.
5. The electromagnetic assembly as recited in claim 3 wherein the armature guide is a molded part and each of the side walls has a centrally located abutment and a pair of spring seats equidistantly spaced on opposite sides of the abutment extending therefrom.
6. The electromagnetic assembly as recited in claim 1 wherein the armature guide is a molded part and each of the side walls has a centrally located abutment and a pair of spring seats equidistantly spaced on opposite sides of the abutment extending therefrom.
7. The electromagnet assembly as recited in claim 6 wherein the rear wall has a pair of openings equidistantly spaced on opposite sides of a centerline and the elastomeric part has a pair of bosses extending into the openings.
8. The electromagnet assembly as recited in claim 1 wherein the rear wall has a pair of openings equidistantly spaced on opposite sides of a centerline and the elastomeric part has a pair of bosses extending into the openings.
9. The electromagnet assembly as recited in claim 8 wherein each of the bosses has an opening extending through the portions of the elastomeric material forming the bosses.
10. The electromagnetic assembly as recited in claim 1 wherein the elastomeric part and the spring have different spring rates.
11. The electromagnetic assembly as recited in claim 10 wherein the spring has a conical shape and the spring rate of the elastomeric part is greater than the rate of the conical spring.
12. The electromagnetic assembly as recited in claim 1 wherein the thickness of the portion of the elastomeric part exposed by the opening is greater than unexposed portions of the elastomeric part and the exposed portion has an opening extending through the material providing the exposed portion.
13. The electromagnetic assembly as recited in claim 1 wherein the spring has a conical shape.
14. An electromagnet assembly comprising:
   a magnet coil having a body with a passage extending through the body and a coil winding surrounding the passage,
   a stationary magnet extending through the passage and having laminated magnet metal pieces providing a pair of pole faces facing in one direction,
   and a magnet armature assembly including;
   a movable armature guide having a rear wall having an opening therein and side walls providing a cavity,
   a magnet armature positioned in the cavity, said armature including a body portion and a pair of legs extending at opposite ends of the body portion toward the pole faces of the stationary magnet and
   an elastomeric part positioned between the rear wall and a rear surface on the body portion for resisting movement of the armature in a first direction relative to the armature guide, said elastomeric part having a portion exposed by the opening and engagable with a stop for limiting movement of the armature assembly in the said one direction and an opening extending through said exposed portion.

* * * * *